June 30, 1936.  A. S. SELIG  2,046,214
DEODORANT RECEPTACLE FOR URINALS
Filed May 28, 1935  2 Sheets-Sheet 1
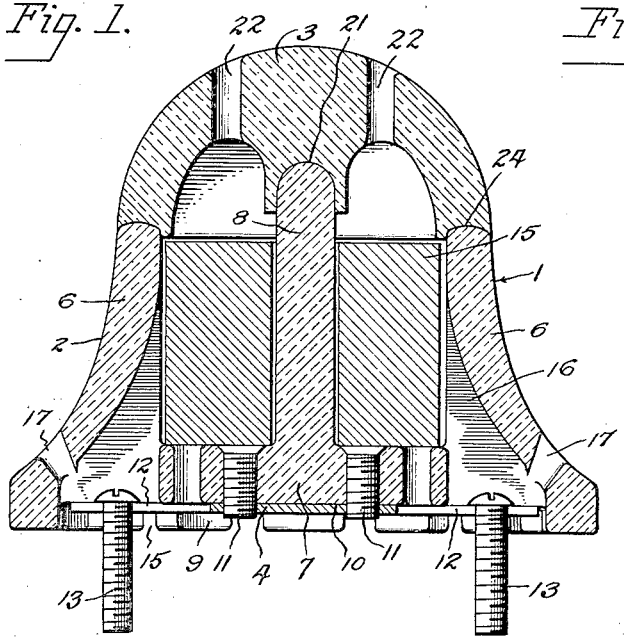
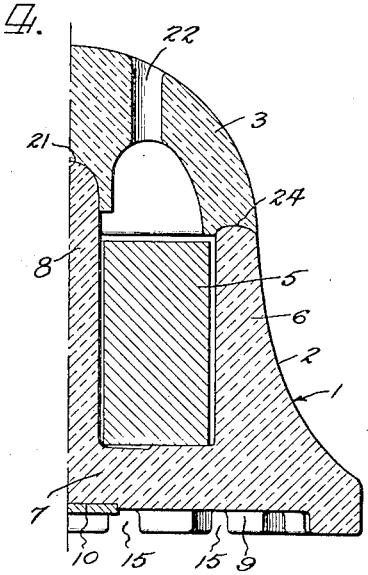
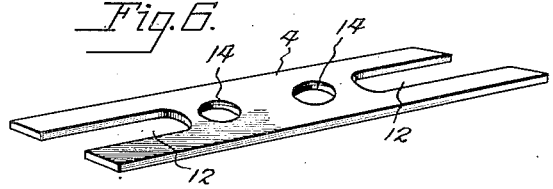
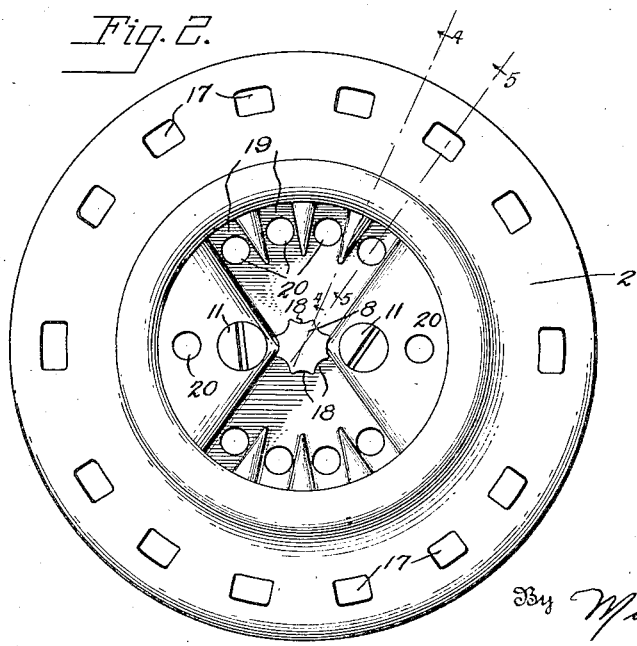
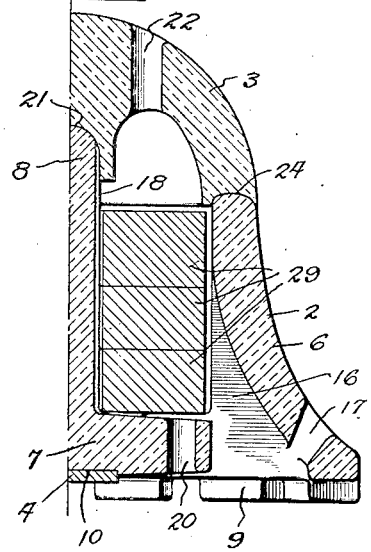
Inventor
Albert S. Selig
By Mason Fenwick & Lawrence
Attorneys June 30, 1936. A. S. SELIG 2,046,214
DEODORANT RECEPTACLE FOR URINALS
Filed May 28, 1935 2 Sheets-Sheet 2
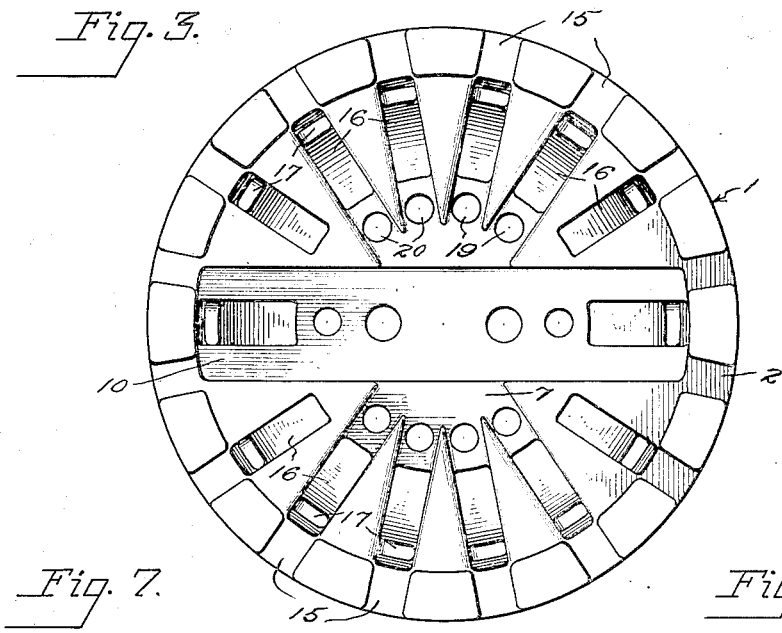
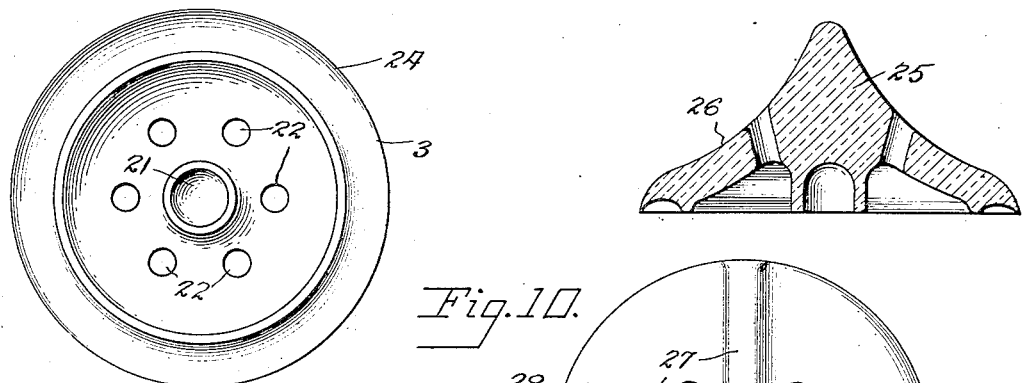
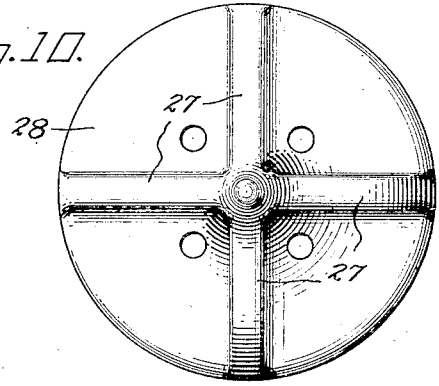
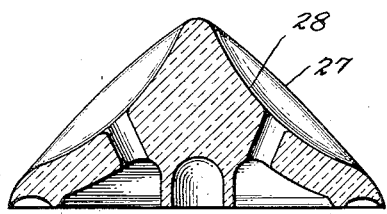
Inventor
Albert S. Selig Patented June 30, 1936

2,046,214

UNITED STATES PATENT OFFICE 2,046,214

DEODORANT RECEPTACLE FOR URINALS

Albert S. Selig, Atlanta, Ga., assignor to The Selig Company, Inc., Atlanta, Ga., a corporation of Georgia Application May 28, 1935, Serial No. 23,925

12 Claims. (Cl. 4—109)

This invention relates to deodorant receptacles for urinals.

It has for its main object the provision of a device of the character described designed to be installed in the drain aperture of the urinal, adapted to contain a normally solid body of deodorant and preferably disinfectant properties, which when exposed to the air evaporates slowly, generating a heavier than air gas which flows into the base of the urinal and down the drain., Another object of the invention is the provision of a receptacle of the class described preferably made of ceramic material so constructed as to completely conceal the metal parts by which it is attached to the structure of the drain aperture when the deodorant cake is in the container.

Another object of the invention is to provide a deodorant receptacle adapted to receive an annular cake of the deodorizing substance and being so constructed as to provide channels against the inner and outer cylindrical walls of the deodorant cake as well as beneath the same, to insure the maximum exposure of said cake to the air, and the free flow of the evolved gases from the surface of said cake.

Still another object of the invention is to provide a deodorant receptacle having an integral body portion comprising side walls forming an enclosure, and a septum above the bottom of said enclosure having a central post, said side walls, septum and post defining a recepter for the deodorant cake, and being suitably channeled and perforated to provide the free flow of gas from the maximum exposed surface of said cake, and to provide for easy and complete drainage of liquid.

A further object of the invention in the provision of the post is to make it difficult to pilfer the cake of deodorizing substance.

Still another object of the invention is to provide a perforated lid for the receptacle, which lid is in part allocated and retained in place by a socket in said lid receiving the end of said post.

Another object of the invention resides in the specific shape of the deodorant cake and in its cooperation with the appurtenant parts of the receptacle.

Other objects of the invention will appear as the following description of a preferred and practical embodiment thereof proceeds.

In the drawings which accompany and form a part of the following specification and throughout the several figures of which the same characters of reference have been employed to designate identical parts:

Figure 1 is a longitudinal section through the deodorant receptacle and the deodorant cake;

Figure 2 is a plan view with the lid removed;

Figure 3 is a bottom plan view;

Figure 4 is a section taken along the line 4—4 of Figure 2, showing the deodorant cake in position;

Figure 5 is a section taken along the line 5—5 of Figure 2;

Figure 6 is a perspective view of the metal strap forming an adapter through which the deodorant receptacle may be secured to drains of various size;

Figure 7 is an inside plan view of the lid;

Figure 8 is a vertical cross section through one form of lid;

Figure 9 is a vertical cross section through another form of lid; and

Figure 10 is a plan view of that form of lid illustrated in Figure 9.

Referring now in detail to the several figures the numeral 1 represents in general the deodorizing and disinfecting receptacle constructed according to the principles of the present invention and comprising two main parts, the body portion 2 and the lid 3, also the adapter strap 4 and certain screws which will later be specifically referred to. The receptacle when in operative condition also includes the annular cake 5 of suitable deodorizing or disinfecting substance preferably capable of evolving a heavier than air gas.

The body portion 2 and lid 3 are preferably formed of ceramic material. The body portion consists of three integral elements, the surrounding wall 6, the septum 7 placed transversely and located a short distance above the lower edge of the surrounding wall and a central post 8 arising from the center of the septum. The septum, post and surrounding wall together form a receiving chamber for the cake of deodorant.

The body portion 2 is provided with a circular recess 9 below the septum having a transverse elongated flat seat 10 for receiving the adapter strap 4 which is secured to the body portion by screws 11 passing through the septum 7. Urinals are provided with circular gratings in the drain aperture fastened down by diametrically spaced screws. These gratings are not all of the same diameter and the screws are not always the same distance apart. The purpose of the adapter strap 4 is to enable the deodorant receptacle to be secured in any sized drain opening. With this end in view, the adapter strap is provided at its opposite ends with elongated slots 12. To install, the adapter strap 4 is separated entirely from the ceramic portion of the receptacle. The grating is removed from the urinal, leaving the two screw holes vacant. The adapter strap 4 is placed across the drain aperture with the slots 12 in registry with the screw holes and the screws 13 are screwed down into said screw holes with their heads against the sides of the slots 12. Thus the adapter strap is held in place. The body portion of the deodorant receptacle, without the lid and deodorant cake is then placed in position over the drain aperture overlying the adapter strap 4 and the heads of the screws 13 in the manner clearly indicated in Figure 1. The screws 11 are then introduced from the top side of the septum 7 and screwed into the holes 14 of the adapter strap making the receptacle securely attached in a stationary position. When the deodorant cake 5 and/or the lid 3 are in place the screws 11 are entirely concealed.

The body portion 2 is provided with a peripheral series of slots 15 indenting its lower edge so as to give free drainage to the urinal and prevent the presence of the deodorant receptacle from causing liquid to back up to any depth in the urinal.

The surrounding wall 6 of the deodorant cake receiving chamber is provided with vertical slots 16 extending substantially the full height of the deodorant cake and opening through the bottom of the deodorant receptacle as is clearly illustrated in Figure 3. Said slots also communicate with the outer exposed surface of the deodorant receptacle by a peripheral series of channels 17 opening in the side wall of the receptacle adjacent the base thereof. Thus each of the slots 16 is provided with two passages for the exit of the heavy gas generated by the slow dissolution of the deodorant cake, one passage permitting the gas to descend directly into the drain and the other permitting it to flow outwardly into the urinal adjacent the bottom of the drain. Therefore, the deodorant receptacle not only serves to destroy any offensiveness arising from the drain itself, but also to deodorize and keep sanitary the entire lower portion of the urinal.

The integral post 8 is provided with a longitudinal series of grooves or flutes 18 surrounded by the wall of the central aperture in the deodorant cake providing a series of gas and drainage passages down the interior surface of said cake, said passages communicating at their base with a series of radiating passages 19 which communicate at their outer ends with the slots 16 and at intermediate points with a system of holes 20 communicating directly with the drain through the bottom of the septum. The floors of the channels 19 slope downwardly toward the periphery of the septum so as to drain away excess moisture and to give a positive direction to the flow of gases and liquid through said passages.

The post 8 extends above the top edge of the body portion, its upper end being received into a socket 21 formed on the inner side of a boss which projects downwardly from the center of said lid 3. The lid is provided with a series of holes 22 which communicate with the interior of the deodorant receptacle directly above the cake of deodorizing substance so that air thus gains access to the top of the deodorant cake for the purpose of deodorization and to liberate the highly desirable gases and to quickly complete the drainage of liquids.

The lid is preferably unsecured with respect to the body portion, being merely formed with an annular recess 24 receiving the upper peripheral edge of the body portion 2. The engaging relation of the post 8 to the socket 21 prevents the accidental displacement of the lid. While the lid is of great convenience and a decided factor in the economic utilization of the deodorant cake, it is not indispensable to the invention and will possibly be discarded by the user after due trial owing to the distastefulness of handling it after it has been used and the deodorant receptacle left open at the top with the deodorant cake exposed. In this respect the post 8 serves the important function of making it difficult for anyone wishing to steal the deodorant cake from taking it out of the deodorant receptacle. It will be understood that the cake diminishes in all dimensions as its surface portions are evaporated by the air which contacts them and it would ordinarily be easy to remove a partially evaporated deodorant cake. However, the presence of the post prevents the cake being canted to effect its removal and also it would be practically impossible to get the fingers in such a position with respect to the deodorant cake as to lift it out. The post also serves as a means to keep foreign matter out of the chamber, such as cigarettes, match sticks, and etc., which will bounce off of the post when the post is exposed and the lid is not used.

It is a question of choice as to the proper external shape of the deodorant receptacle, the main consideration being that it shall not clog with or collect foreign matter and that it shall have a pronounced anti-splash characteristic. The several figures show that the mouths of all of the channels flare and have smoothly rounded edges thus tending to prevent the adherence of foreign matter and also avoiding clogging and making cleansing particularly easy. Figure 1 shows a form of the invention in which its exterior surface is substantially bell-shaped, the lid being of spherical curvature. Figure 8 shows a form of lid 25 in which the surface is annularly concaved as indicated at 26. Figure 10 shows an alternative form in which the lid is shaped with four intersecting ridges 27 between which the surface of the lid is of concave curvature as shown at 28. It will be understood that regardless of shape, the surface of the deodorant receptacle in its preferred form will be devoid of sharp edges or abrupt angles.

The deodorant cake may be in the form of a single cylinder of proper height as indicated at 5 in Figure 1. It may also be made in the form of shallow wafers 29 having central holes adapting them to be placed co-axially upon the post 8 and to form in the aggregate a deodorant cake of the proper height to fill the receiving chamber.

While I have in the above description disclosed what I believe to be a preferred and practical embodiment of the invention, it will be understood to those skilled in the art that the details of construction as shown and described are merely by way of example and not intended to limit the scope of the invention as defined in the appended claims.

What I claim is:

1. Deodorant receptacle comprising a surrounding side wall, a partition bridging the lower portion of said side wall, a post arising from said partition, the three aforesaid elements being integral and defining a receiver for an annular deodorant cake and a lid seating upon the edge of said side wall and being imperforate above the end of said post.

2. Deodorant receptacle comprising a surrounding side wall, a partition bridging the lower portion of said side wall, and a post arising from said partition, the three aforesaid elements defining a receiver for an annular deodorant cake, said post and the surrounding side wall being formed with downwardly extending channels opening along the face of the deodorant cake, said channels opening externally of said receiver adjacent the bottom of said receptacle.

3. Deodorant receptacle comprising a surrounding side wall, a partition bridging the lower portion of said side wall, and a post arising from said partition, the three aforesaid elements defining a receiver for an annular deodorant cake, said post and surrounding side wall being formed with downwardly extending channels opening along the interior and exterior faces of said cake, said partition being provided with channels communicating with the channels of said post and surrounding side wall and with the exterior of said receptacle adjacent the bottom thereof.

4. Deodorant receptacle comprising a surrounding side wall, a partition bridging the lower portion of said side wall, and a post arising from said partition, the three aforesaid elements defining a receiver for an annular deodorant cake, said post and surrounding wall being formed with downwardly extending channels opening along the interior and exterior faces of said cake, said partition having radial channels sloping downwardly from the center, communicating with the channels of said post and surrounding wall and with the exterior of said receptacle adjacent the base thereof.

5. Deodorant receptacle comprising a surrounding side wall, a partition bridging the lower portion of said side wall above the plane of the bottom edge thereof, a post arising from said partition, the three aforesaid elements defining a receiver for an annular deodorant cake, said post and the surrounding side wall being provided with downwardly extending channels opening along the interior and exterior faces of said cake, said partition having radial channels communicating with the channels of said post and surrounding side wall and with the exterior of said receptacle adjacent the bottom thereof.

6. Deodorant receptacle comprising a surrounding side wall, a partition bridging the lower portion of said side wall above the plane of the bottom edge thereof, and a post arising from said partition, the three aforesaid elements defining a receiver for an annular deodorant cake, said post and surrounding side wall being provided with downwardly extending channels opening along the interior and exterior faces of said cake, said partitions having radial channels sloping downwardly from the center and communicating with the channels of said post and surrounding side wall, said surrounding wall being formed with externally opening ports above and below said partitions, communicating with the system of interior channels.

7. Deodorant receptacle comprising a surrounding side wall, a partition bridging the lower portion of said side wall above the plane of the bottom edge thereof, and a post arising from said partition, the three aforesaid elements defining a receiver for an annular deodorant cake, said post and surrounding side wall being provided with downwardly extending channels opening along the interior and exterior faces of said make, said partitions having radial channels sloping downwardly from the center, and communicating with the channels of said post and surrounding wall, said surrounding wall being formed with externally opening ports above and below said partition, communicating with the system of interior channels, the channels of said partition having perforations placing them into direct communication with the space beneath said partitions.

8. Deodorant receptacle comprising a surrounding side wall, a partition bridging the lower portion of said side wall above the bottom thereof, and a post arising from said partition, the three aforesaid elements being integrally related and defining a receiver for an annular deodorant cake, an adapter strap wholly received within the space beneath said partition, said adapter strap having spaced slots for receiving screws to attach said strap to the screw holes of a urinal drain, said partition having holes aligning with threaded apertures in said adapter strap for inserting attaching screws from the interior of said receiver for securing said strap to said receptacle.

9. Deodorant receptacle comprising a surrounding side wall, a partition bridging the lower portion of said side wall, and a post arising from said partition, the three aforesaid elements being non-metallic, integrally related, and defining a receiver for an annular deodorant cake, said receptacle having a recess beneath said partition, and an adapter strap adapted to be secured, on the one hand, to an element of a drain, and on the other hand, to said receptacle for fixing the latter, said strap being entirely concealed within the said recess.

10. Deodorant receptacle comprising a surrounding side wall, a partition bridging the lower portion of said side wall, and a post arising from said partition, the three aforesaid elements being integrally related and defining a receiver for an annular deodorant cake, a lid fitting upon the top edge of said surrounding wall and having a socket receiving the upper end of said post, said lid being perforated.

11. Deodorant receptacle comprising a surrounding side wall, a partition bridging the lower portion of said side wall, and a post arising from said partition, the three aforesaid elements being integrally related and defining a receiver for an annular deodorant cake, including a lid seated on the upper edge of said surrounding wall and having a socket receiving the end of said post, said lid being non-metallic.

12. Deodorant receptacle comprising a surrounding side wall, a partition bridging the lower portion of said side wall, and a post arising from said partition, the three aforesaid elements defining a receiver for an annular deodorant cake, said post, surrounding wall and partition being provided with an internal system of channels opening along the interior and exterior surfaces of said deodorant cake, said internal system of channels communicating with the exterior of said receptacle by way of ports in the outer surface thereof, a lid seated upon the upper edge of said surrounding wall, said lid being perforated, the exterior perforations and ports of said receptacle having rounded edges.

ALBERT S. SELIG.